(12) United States Patent
Holman (10) Patent No.: US 11,865,471 B2
(45) Date of Patent: Jan. 9, 2024

(54) APPARATUS FOR EMBEDDING A MAGNET IN FLEXIBLE ELASTIC MATERIAL

(71) Applicant: Heroes Will Rise, Inc., Providence, RI (US)

(72) Inventor: Cas Holman, Brooklyn, NY (US)

(*) Notice: Subject to any disclaimer, the term of this patent is extended or adjusted under 35 U.S.C. 154(b) by 0 days.

(21) Appl. No.: 18/055,787

(22) Filed: Nov. 15, 2022

(65) Prior Publication Data
US 2023/0158417 A1    May 25, 2023

Related U.S. Application Data

(60) Provisional application No. 63/282,727, filed on Nov. 24, 2021.

(51) Int. Cl.
| | | |
|---|---|---|
| *A63H 33/00* | (2006.01) | |
| *A63H 33/04* | (2006.01) | |
| *B29C 45/14* | (2006.01) | |
| B29L 31/52 | (2006.01) | |
| B29K 83/00 | (2006.01) | |
| B29K 105/04 | (2006.01) | |
| B29K 75/00 | (2006.01) | |

(52) U.S. Cl.
CPC ..... *A63H 33/046* (2013.01); *B29C 45/14377* (2013.01); *B29K 2075/00* (2013.01); *B29K 2083/00* (2013.01); *B29K 2105/04* (2013.01); *B29L 2031/5209* (2013.01)

(58) Field of Classification Search
None
See application file for complete search history.

(56) References Cited

U.S. PATENT DOCUMENTS

| | | |
|---|---|---|
| 6,702,641 B2 | 3/2004 | Dakley |
| 7,641,534 B2 | 1/2010 | Holman |
| 2004/0152393 A1 | 8/2004 | Good |
| 2005/0159076 A1 | 7/2005 | Kowalski |

*Primary Examiner* — Alexander S Thomas
(74) *Attorney, Agent, or Firm* — Joseph D. Hodler (57) ABSTRACT

A magnet is embedded in a flexible elastic material, providing a means of temporarily connecting the flexible elastic material to ferromagnetic objects. A rigid cup provides a container for anchoring the magnet in the flexible elastic material. The cup also provides a structure to bind with the flexible elastic material. The magnet rests in the base of the cup, which extends past the surface of the material, allowing the magnet's forces to extend outside the base of the cup. The remainder of the cup resides within the material.

20 Claims, 12 Drawing Sheets

APPARATUS FOR EMBEDDING A MAGNET IN FLEXIBLE ELASTIC MATERIAL

CROSS-REFERENCE TO RELATED APPLICATIONS

The present application is a Non-Provisional application which claims the benefit of Provisional Patent Application No. 63/282,727, filed Nov. 24, 2021.

FIELD

This invention generally relates to embedding magnets in flexible elastic material, and particularly to embedding magnets in construction modules with flexible elastic bodies capable of connecting to other modules and ferromagnetic surfaces.

BACKGROUND

Typical magnetic construction modules enable users to create rigid geometric structures by connecting multiple modules together. The inventor identified people's desire to interact with such modules, but envisioned a more organic form, providing flexibility and variability. These new modules with organic characteristics were described in U.S. Pat. No. 7,641,534, titled Organic Magnetic Construction Module.

Those modules were made of flexible material, which allowed a user to bend, stretch and compress them. They sparked the imagination of children and adults alike. While the organic nature of the product was appealing, its flexibility also caused a limited lifespan.

A weak point developed around the embedding of the magnet to the ends of flexible limbs. In one embodiment, the magnets were glued to an anchor, but simply pulled away from the anchor as the adhesive was not strong enough. In a second embodiment, the magnets were structurally connected to an anchor but pulled the anchor out, as the silicone failed to secure it under force. A third embodiment, with a magnet in a cup proved more tenable, but created a weakness around the outsides of the limbs, where the flexible material would tear. The base of the cup also tore where the edge of the magnet rested against the interior of the base.

A solution is needed to improve the organic magnetic construction module, that enables users to connect magnetic limbs to ferromagnet surfaces or other modules, with such force that they can maintain connections, but easily disconnect without tearing the flexible material. This solution will embed magnets in flexible elastic material, capable of a wide range of applications in addition to the organic construction module.

SUMMARY

The present invention is directed to an apparatus for embedding magnets in flexible elastic material. One application for this apparatus is in an improved organic magnetic construction module. The module has organic properties in its texture and flexibility. In one embodiment, magnets are embedded in the ends of limbs, capable of connecting limbs on a single module to each other, or capable of connecting the module to a ferromagnetic surface or another module.

The improvement over the prior art is in the means of embedding the magnets in the flexible material. Of the earlier envisioned means of embedding a magnet, the method of placing a cylindrical magnet inside a cup proved the most efficacious.

An improved cup has several advantages over the prior art. The magnets are a different size with a smaller diameter, allowing more material around the outside of the cup. The magnets are set further away from the exterior surface of the cup end, managing the strength of the connection, while also increasing the strength of the cup. The cups have a rounded edge on the exterior rim, and other edges, limiting the ability of the cup to tear the flexible material. The cups have a modified design allowing more material to bind within the cup, creating a stronger connection between the flexible elastic material and the embedded magnet.

In one embodiment, the cup is used in a module formed of a flexible material with a bulbous body and one or more limbs emanating from the core. The material is squishy and stretchy, invoking a lifelike organism. The limbs narrow as they extend from the body, but thicken at their ends. Each limb's end contains an embedded magnet. The magnets may connect to another limb on the module, to a metal surface, or to a separate module.

In this embodiment modules may have multiple limbs of various lengths. The differing limb lengths represent the variability of nature and facilitate the creation of unique structures when combining modules. A critical feature of the module is the ability to connect its limbs to surfaces and to the limbs of other modules. In playing with the modules, the user can connect and disconnect the limbs easily to try new arrangements and discover new possibilities.

The present invention is directed to the means of embedding a magnet in flexible material and has applications outside of an organic magnetic construction module. The invention may be utilized in any form of elastic flexible material. The invention may reside in a limb, or in several other surfaces. Other applications include the embedding of a magnet in a flat surface, a concave surface, a convex surface, or complex multifarious surfaces.

BRIEF DESCRIPTION OF THE DRAWINGS

In order to describe the manner of obtaining the above-recited and other advantages of the disclosure, a more particular description of the principles briefly described above are rendered by reference to specific embodiments in the appended drawings. Understanding that these drawings depict only exemplary embodiments of the disclosure and are not to be considered limiting of its scope, the principles herein are described and explained with additional specificity and detail through the accompanying drawings in which.

DETAILED DESCRIPTION

The present invention is directed to an apparatus for embedding magnets in flexible elastic material. One application for this apparatus is in an improved organic magnetic construction module. The modules are composed of flexible material with embedded magnets for connecting them to other ferromagnetic objects. The improvement is in the means of embedding the magnets in the flexible material.

The general composition of the module is flexible and durable. The ability to stretch, bend, squeeze, bounce, and wobble are desirable characteristics imbuing organic qualities. Exemplary materials include thermoplastic polyurethane, silicone, polyurethane rubber, and flexible urethane foams. In one embodiment, the module is made from platinum core silicone having a tensile strength of about 475 psi, Die B tear strength pli, and a shore A hardness of between about 10 and about 40.

Organic Magnetic Construction Module

FIG. 1, FIG. 2, FIG. 3, and FIG. 4 show views of one embodiment of the module, having one body with three limbs. A magnet 201, 301, 401 is embedded in the end of each limb. FIGS. 1-4 show the flexible nature of the module.

Figure 1:
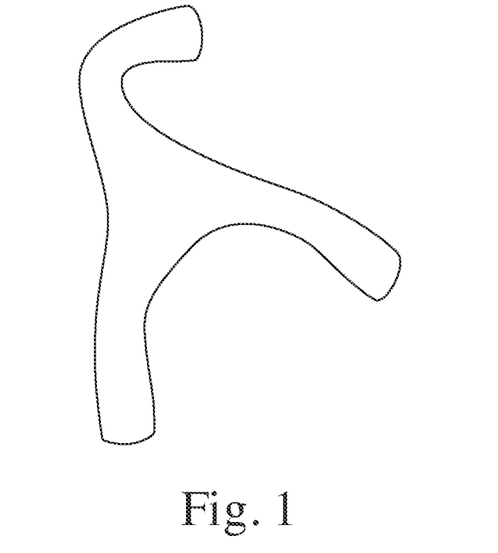
FIG. 1 is a perspective view showing the flexible nature of one embodiment of a magnetic construction module.
Figure 2:
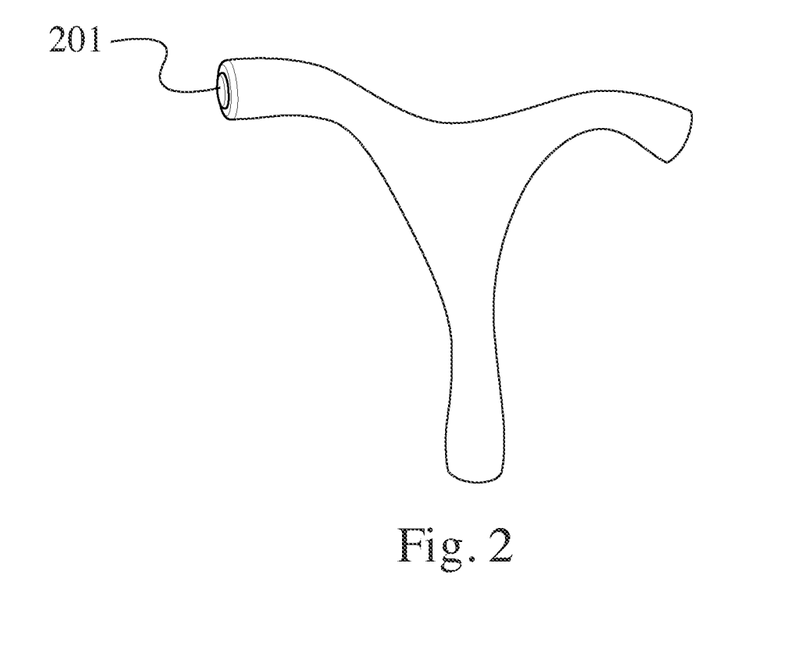
FIG. 2 is a perspective view showing the flexible nature of one embodiment of a magnetic construction module.
Figure 3:
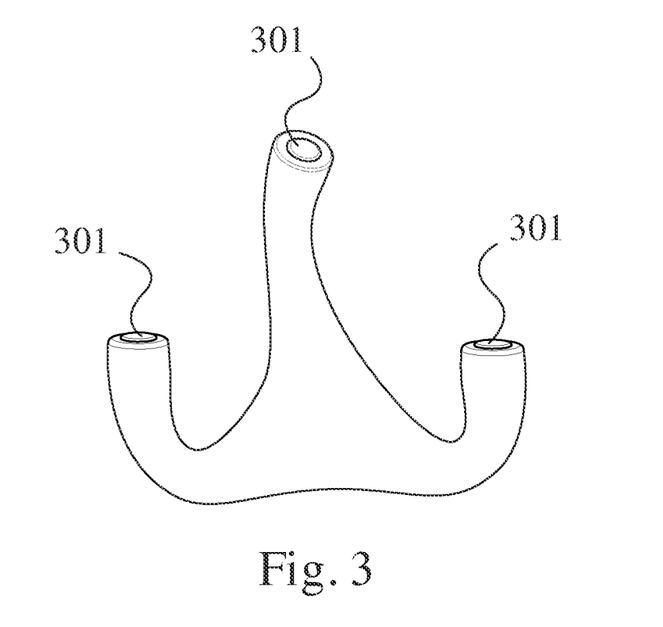
FIG. 3 is a perspective view showing the flexible nature of one embodiment of a magnetic construction module.
Figure 4:
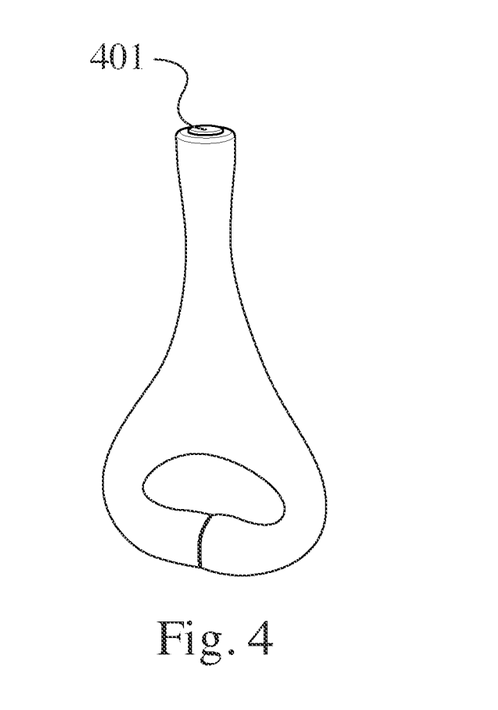
FIG. 4 is a perspective view showing the flexible nature of one embodiment of a magnetic construction module, where two limbs are connected by their magnets.

FIG. 4 shows one embodiment of a module with two of its limbs connected. The embedded magnets may have a positive or negative polarity emanating from the end of the limb. Where one limb is positive and another is negative, the limbs may connect, forming a temporary attachment. Where the ends of two limbs have the same polarity, the limbs would repel each other and not connect. One embodiment of the invention has two positive ends and one negative end. Another embodiment has two negative ends and one positive end. Another embodiment has the same polarity for all limbs. Optimally, the polarity of the magnet is randomly chosen, such that the ends of the limbs vary from one module to another and necessitate differing arrangements of module connections.

Figure 5:
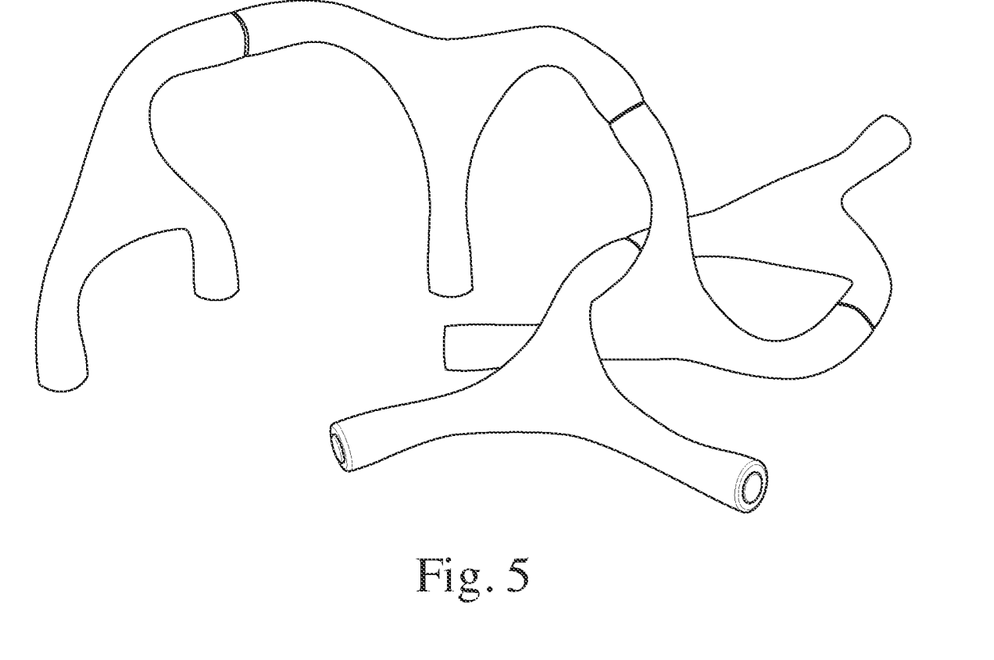
FIG. 5 is a random arrangement of one embodiment of five magnetic construction modules connected by their magnetic limbs.
Figure 6:
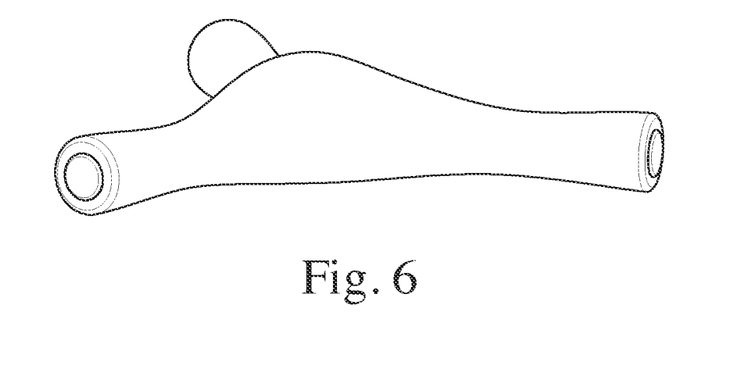
FIG. 6 is a side view of one embodiment of a magnetic construction module showing the bulbous nature of the body and the ends of two limbs.

FIG. 5 shows a random arrangement of one embodiment of five modules. This figure shows how modules may connect to each other's limbs to create a larger structure. FIG. 6 shows one embodiment of the module with three limbs extending from a bulbous body.

Figures 7, 8:
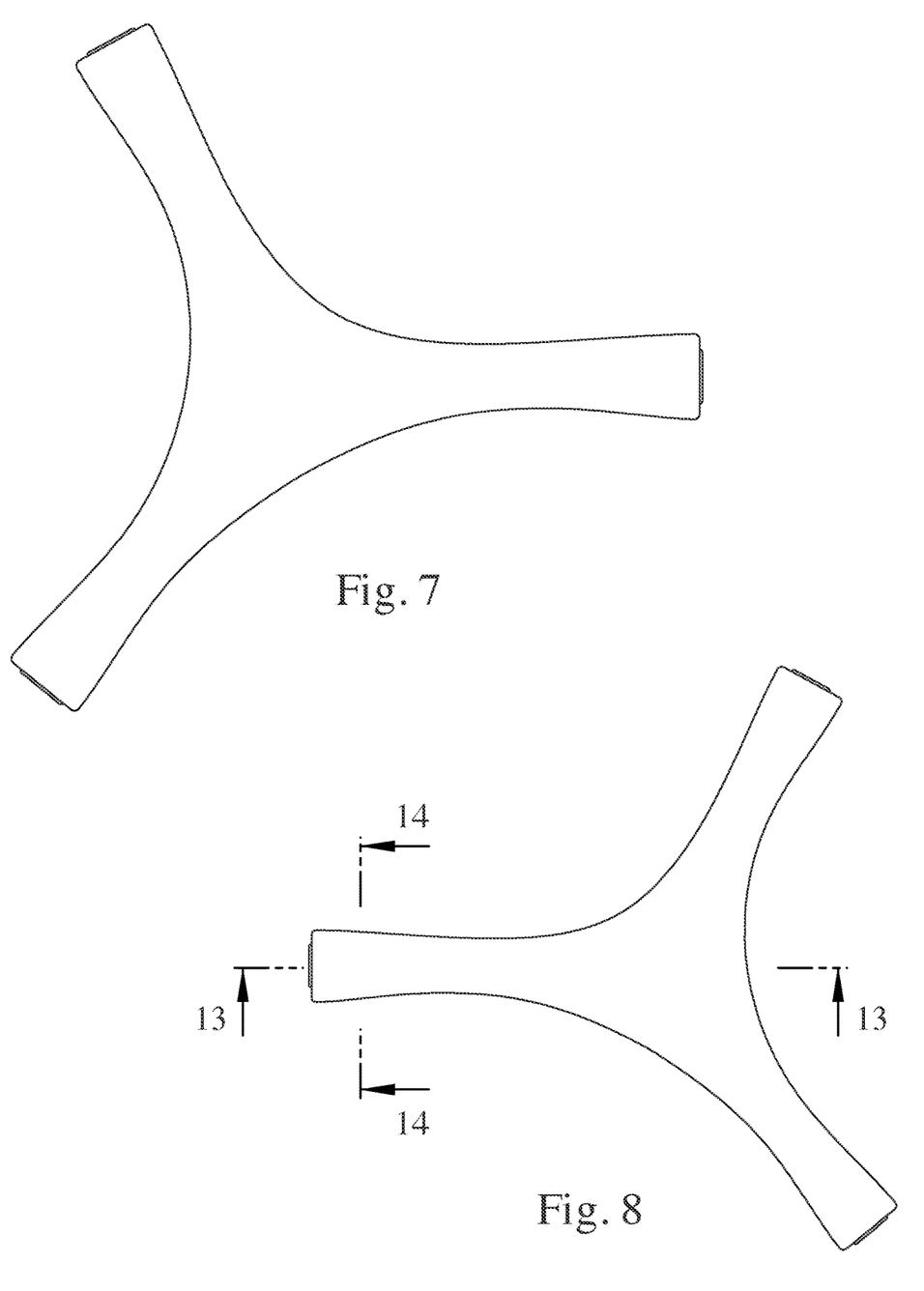
FIG. 7 is a top view of a prior art organic magnetic construction module.
FIG. 8 is a top view of a new organic magnetic construction module comprising one embodiment of the improved cup for embedding magnets in the limbs.

FIG. 7 shows a top view of the prior art module. FIG. 8 shows a top view of the new improved module. One of the solutions to the embedded magnet was to reduce the overall scale of the module by fifteen percent (15%), which resulted in a decrease of volume by approximately thirty-eight and five tenths' percent (38.5%). The prior art module had a volume of 49,848.8 cubic mm, and the new improved module has a volume of 30,650.12 cubic mm.

Decreasing the overall size of the module lowered the overall weight, and thus decreased the gravitational effects on the module. The strength of the flexible material remained the same, and with relatively lower forces on the limbs, there is now less force on the areas around the embedded magnet.

Cup for Holding the Embedded Magnet

The invention is an apparatus for embedding a magnet in a flexible elastic material. The apparatus is referred to as a "cup" throughout this specification, however the form of the cup may vary. In one embodiment, the cup is cylindrical, with one solid end, the base. The height of the cylinder makes the walls of the cup, leading to an opening opposite the base. In one embodiment, the walls of the cup have holes to allow flexible elastic material to bind with the cup during a curing process. In one embodiment, the holes are substantially towards the open end of the cup.

Alternative embodiments of the cup may not be cylindrical. Rectangular, triangular, oval, or any other three-dimensional shape is envisioned. The cup must perform two functions, to securely hold a magnet within, and to have a structure for binding with the surrounding flexible elastic material.

In one embodiment of the cup, the walls are angled at 88.5 degrees, to create an open end slightly larger than the base. This affords easier manufacturing of the cup, in a single mold, and easier insertion of the magnet.

In one embodiment, the cup is made of relatively rigid plastic. Specifically, the cup may be composed of polypropylene or acrylonitrile butadiene styrene. Other rigid materials capable of harnessing an embedded magnet are envisioned.

Figure 9:
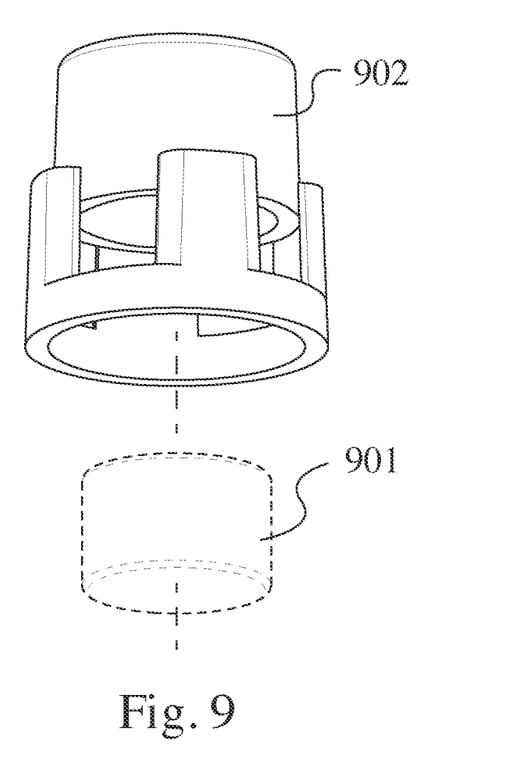
FIG. 9 is a perspective view of a prior art cup and a prior art magnet.
Figure 10:
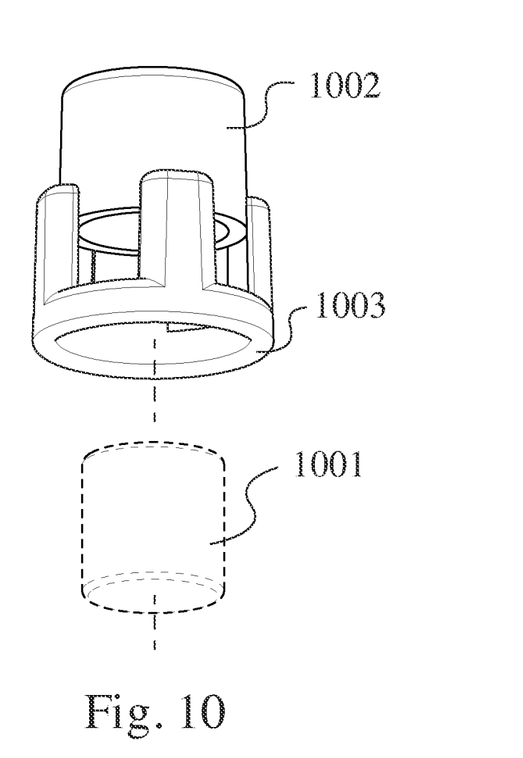
FIG. 10 is a perspective view of one embodiment of the new improved cup and magnet.

FIG. 9 shows the prior art magnet 901 for insertion into the prior art cup 902. FIG. 10 shows the new magnet 1001 for insertion into the new improved cup 1002. The new magnet 1001 has a narrower diameter than the prior art magnet 901, affording a thinner cup. This allows more of the limb to be composed of the flexible material, and hence more coating around the outside of the cup. The thicker layer of flexible material on the outside of the cup provides more cushioning between external forces and the rim 1003 of the cup, ameliorating the tendency to tear along that line.

The prior art magnet 901 had an eight (8) mm diameter and a five (5) mm height with a pull force of four and fifty-four hundredths (4.54) pounds. The new magnet 1001 has a six (6) mm diameter and a six (6) mm height. One embodiment of the invention uses a neodymium magnet (N42) with a pull force of five and five-tenths (5.5) pounds. An alternative embodiment of the invention uses a neodymium magnet (N52) with a pull force of six and five-tenths (6.5) pounds. It is envisioned that other size and strength magnets may be used with other embodiments.

Figure 11:
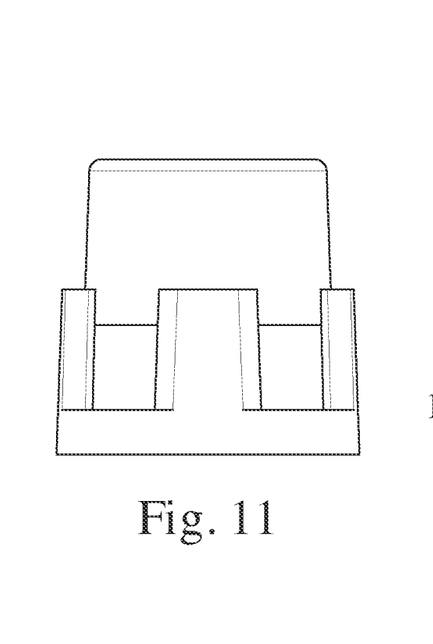
FIG. 11 is a side view of a prior art cup.
Figure 12:
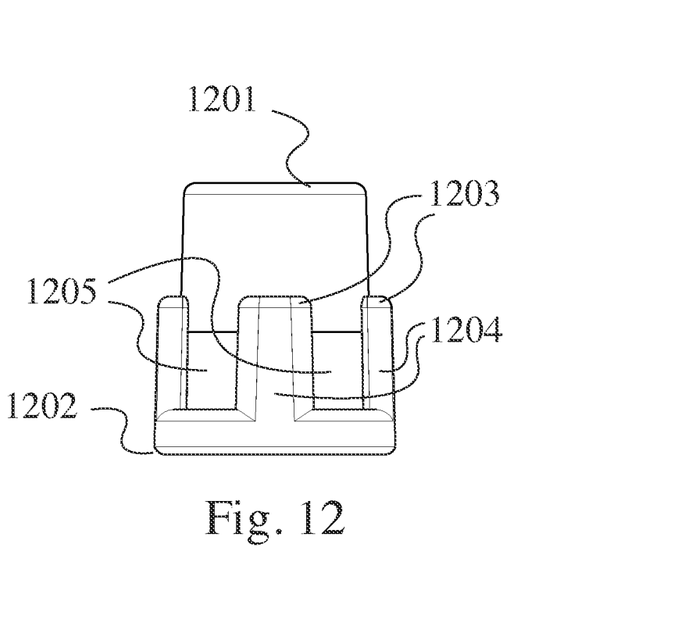
FIG. 12 is a side view of one embodiment of the new improved cup.

FIG. 11 shows a side view of the prior art cup. FIG. 12 shows a side view of the new improved cup. The top side 1201 is the base of the cup substantially flush to the end of the limb, or to the surface of the material in other embodiments. The bottom side 1202 is the rim of the cup and is positioned extending up into the limb.

One improvement to the new cup is the rounding of the outer edges of the cup's structure. This includes the rounding of the rim 1202, and the bottom edges 1203 of the columns 1204. A problem arising from the prior art cup was the sharp right-angle edges of the rim and bottoms of the columns. When the flexible material was squeezed, pushed, or pulled against the edge of the rim, it started to cut through the limb, eventually tearing the magnet and cup away from the material. The rounding of the rim on the new cup eliminates the cutting issue. One embodiment of the invention provides a 0.5 mm radius for the rounding of the edges, including the rim and bottoms of the columns.

Another improvement of the new cup is the narrowing of the columns 1204 in proportion to the holes 1205. In the manufacturing process, the cup is placed into a mold such that the flexible material flows through the holes, fills all space within and around the cup, then cures. The thinner the columns are in proportion to the relatively larger holes, the stronger the bind will be between the flexible material and the cup. In one embodiment, the proportion of the holes in the walls is greater than one-half of the surface of the walls.

Figure 13:
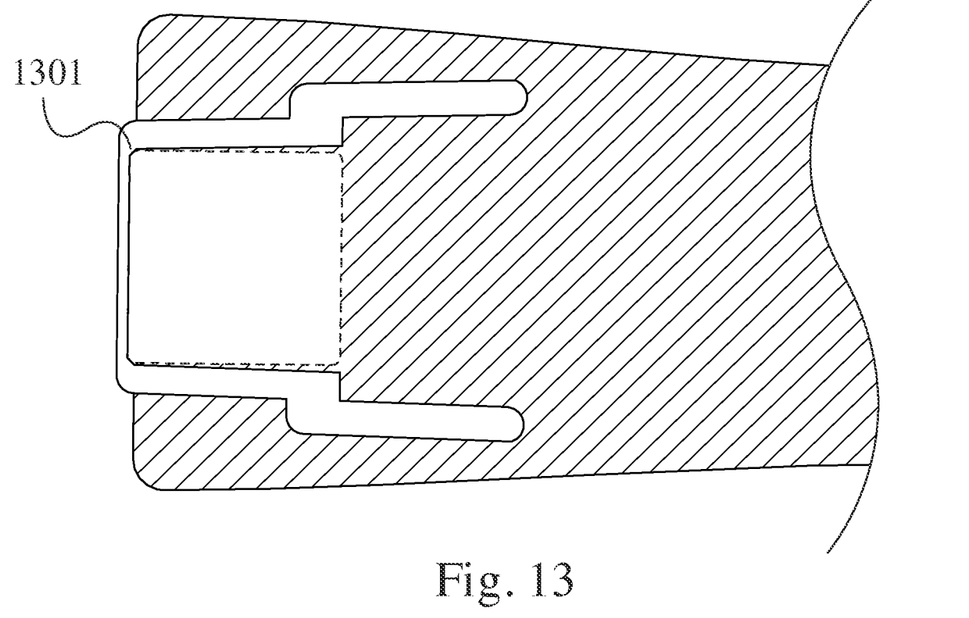
FIG. 13 is a section cut detail from FIG. 8 of the end of one limb of a new improved organic magnetic construction module, showing a cross-section of the new improved cup.

FIG. 13 shows a cross section of FIG. 8. One embodiment of the module has a new improved magnet and cup embedded in the end of one limb. An additional feature of the new cup is a chamfered edge 1301 on the interior of the cup base, where the magnet rests. In one embodiment, the chamfered edge 1301 is angled at forty-five (45) degrees and extends the circumference of the interior of the cup's base.

The chamfered edge 1301 adds stability to the structure of the cup. Despite being smaller, the cup is relatively stronger. The magnet rests against this edge, transferring structural forces laterally away from the base of the cup. The chamfered edge prevents the magnet from tearing through the base of the cup. It can withstand the strength of a magnet necessary to form connections with other ferromagnetic objects, and to hold the module against gravitational forces.

Figure 14:
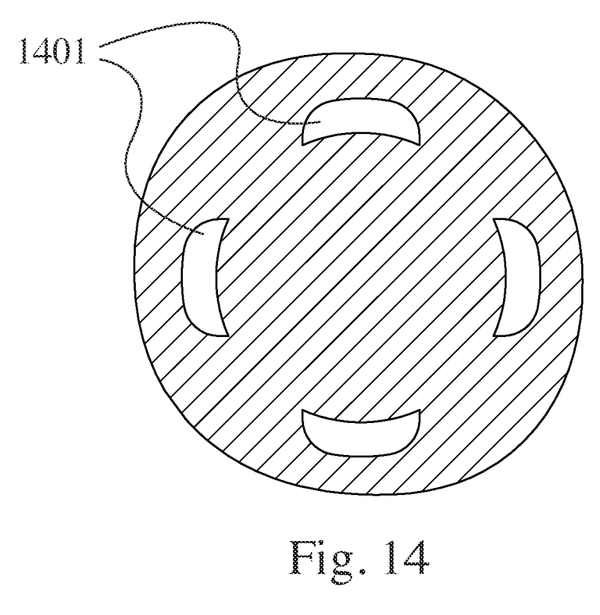
FIG. 14 is a section cut detail from FIG. 8 of the end of one limb of the new improved organic magnetic construction module, showing a cross-section of the limb through the columns of the new improved cup.

FIG. 14 shows a cross section of FIG. 8. This embodiment of the module has a new improved magnet and cup embedded in the end of one limb. The columns 1401 of the cup are thinner in relation to the holes, providing a greater proportion of open area filled by flexible material. This creates a stronger bind between the cup and the body of the module.

Additionally, the thickness of flexible material surrounding the outside of the cup and cup columns is increased. This provides a better hold of the cup and more cushioning between the rigid cup material and external forces against the module.

Applications in Various Surfaces and Objects

Figure 15:
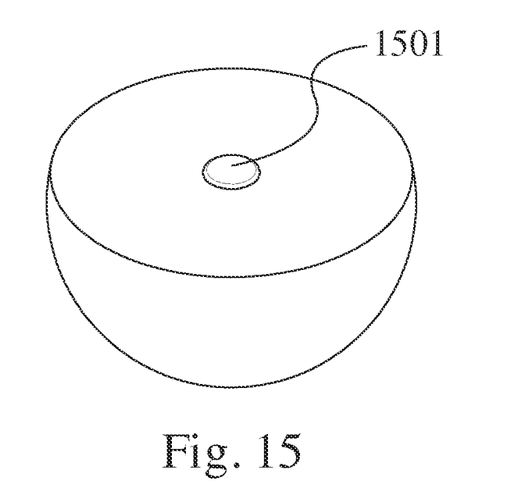
FIG. 15 is a perspective view of an object with a magnet embedded in a flat surface.
Figure 16:
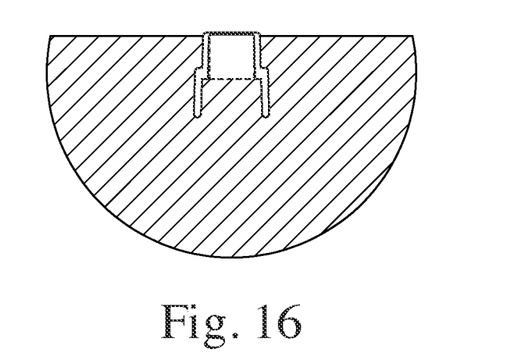
FIG. 16 is a front section cut of the object in FIG. 15.

In addition to the organic construction module, the apparatus may embed magnets in other objects composed of flexible elastic material in varying shapes. FIG. 15 shows a perspective view of an object with a magnet 1501 embedded in a flat surface. FIG. 16 shows a front section cut of the object shown in FIG. 15. Embodiments with a flat surface may provide more security in holding the cup, as more material surrounds the edges. Other embodiments comprised of flat surfaces are envisioned.

Figure 17:
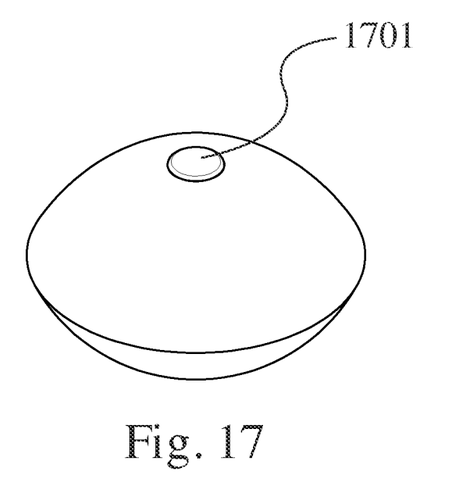
FIG. 17 is a perspective view of an object with a magnet embedded in a convex surface.
Figure 18:
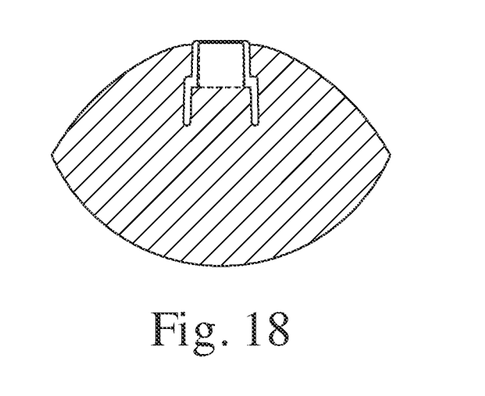
FIG. 18 is a front section cut of the object in FIG. 17.

FIG. 17 shows a perspective view of magnet 1701 embedded in an object with a convex surface. FIG. 18 shows a front section cut of the object in FIG. 17. Other embodiments comprised of convex surfaces are envisioned.

Figure 19:
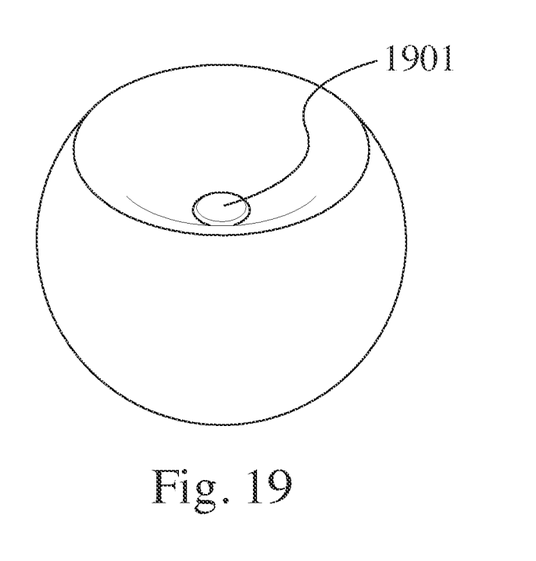
FIG. 19 is a perspective view of an object with a magnet embedded in a concave surface.
Figure 20:
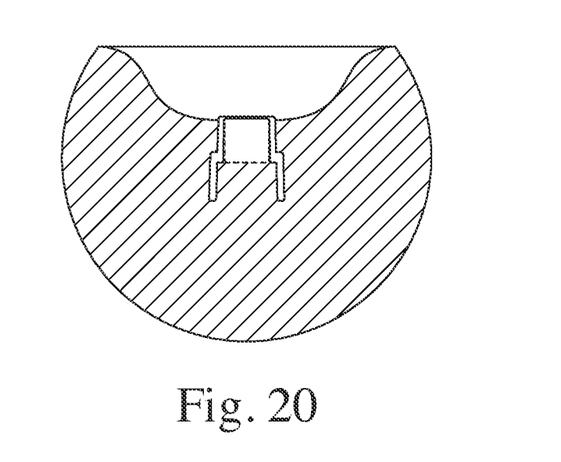
FIG. 20 is a front section cut of the object in FIG. 19.

FIG. 19 shows a perspective view of magnet 1901 embedded in an object with a concave surface. FIG. 20 shows a front section cut of the object in FIG. 19. Other embodiments comprised of concave surfaces are envisioned.

Figure 21:
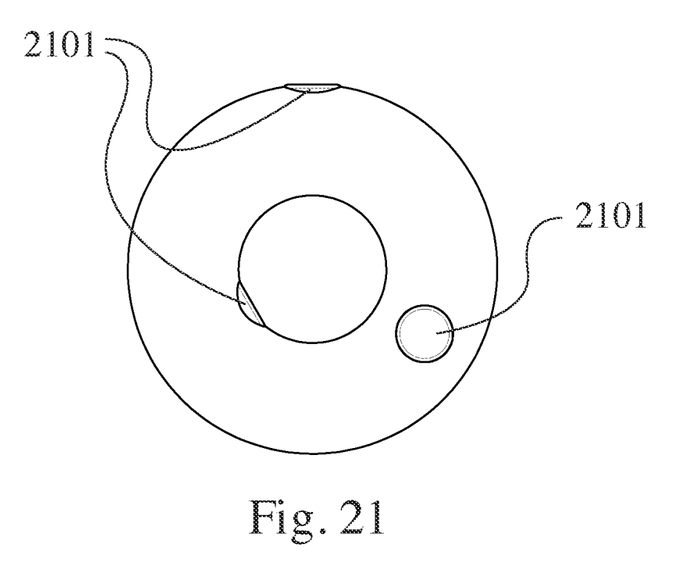
FIG. 21 is front view of a torus-shaped object with three magnets embedded in multifarious curved surfaces.
Figure 22:
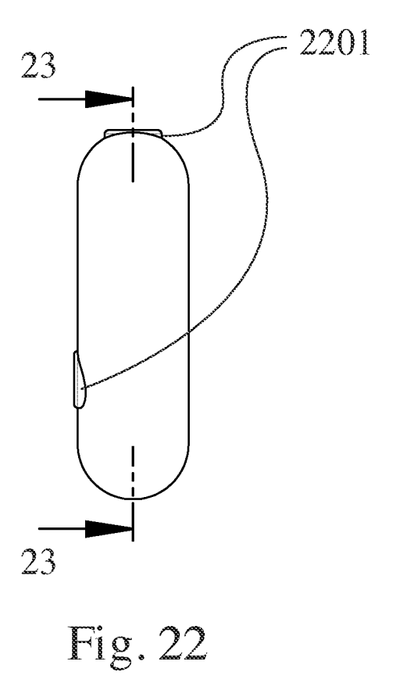
FIG. 22 is a side view of the object in FIG. 21.
Figure 23:
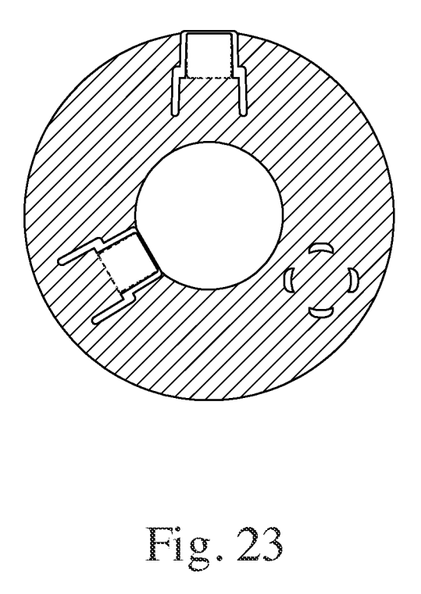
FIG. 23 is a section cut of the object in FIG. 22.

FIG. 21 is a front view of an exemplary embodiment with various curved surfaces. FIG. 21 shows a torus-shaped object with three magnets 2101 embedded in multifarious curved surfaces. This embodiment shows how the apparatus may embed the magnet in a concave or convex surface, as well as a surface with multiple curvatures. FIG. 22 is a side view of the torus. The base of the cup extends from the surface. The walls of the cup around the base 2201 may slightly protrude from the surface to accommodate any variations. The apparatus may embed a magnet in any surface thicker than the height of the cup's walls. FIG. 23 shows a section cut of the torus, with the cups fully embedded within the flexible elastic material.

Figure 24:
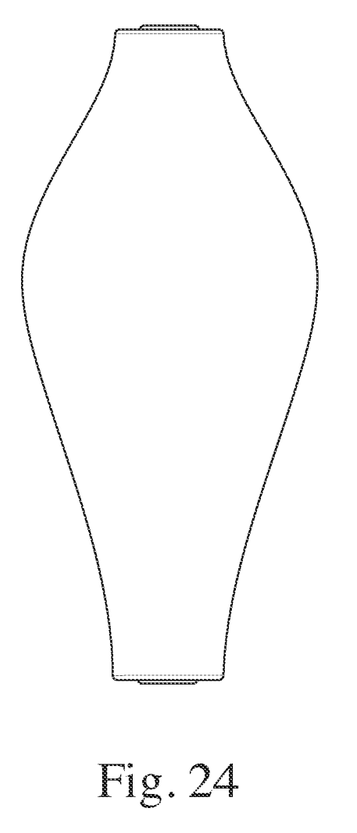
FIG. 24 is a front view of an alternative embodiment of a bulbous magnetic construction module with two embedded magnets at opposite ends.
Figure 25:
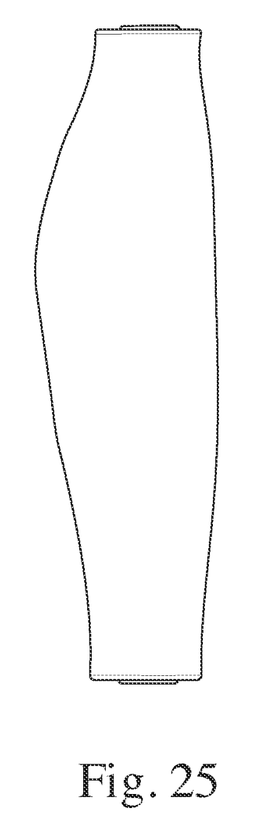
FIG. 25 is a side view of the module in FIG. 24.
Figure 26:
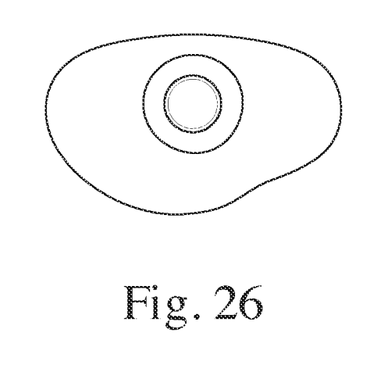
FIG. 26 is a top view of the module in FIG. 24.

FIGS. 24, 25, and 26 show an alternative embodiment of a magnetic construction module. This embodiment is comprised of two embedded magnets at opposite ends of an organic-shaped object.

Figure 27:
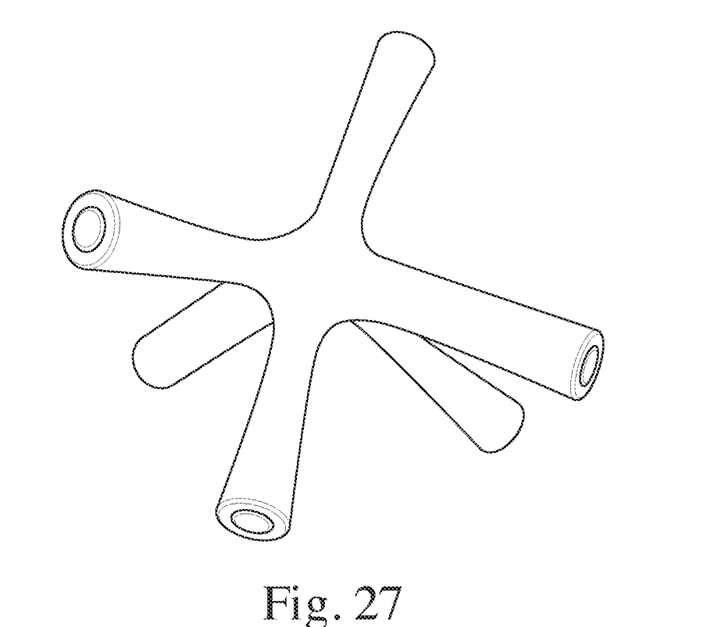
FIG. 27 is an alternative embodiment of a magnetic construction module with six limbs.

FIG. 27 shows an alternative embodiment of a magnetic construction module with six limbs. A magnet is embedded in the ends of each limb, similar to the first embodiment shown in FIG. 1. Alternative embodiments with four, five, seven or any number of limbs are envisioned.

Figure 28:
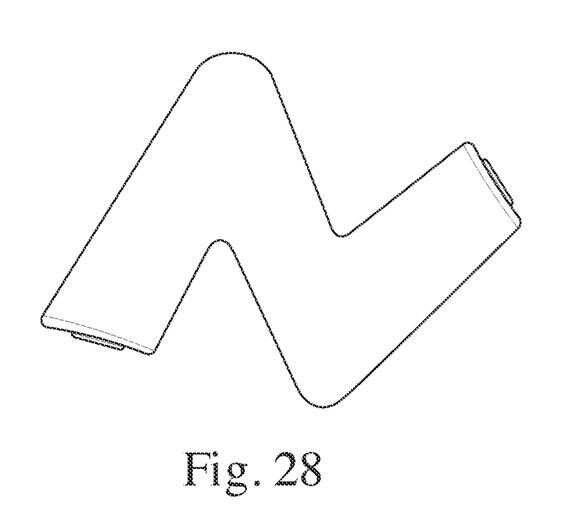
FIG. 28 is a front view of an alternative embodiment of a zig-zag-shaped magnetic construction module with two embedded magnets at opposite ends.
Figure 29:
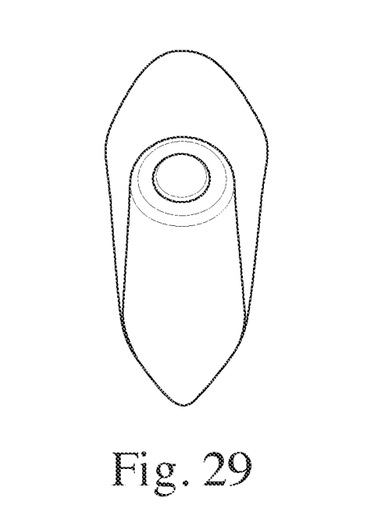
FIG. 29 is a side view of the module in FIG. 28.

FIGS. 28 and 29 show an alternative embodiment of a zig-zag-shaped magnetic construction module with two embedded magnets at opposite ends. The invention is applicable to any shape and any surface of flexible elastic material.

CONCLUSION

While there have been shown and described illustrative examples of an apparatus for embedding a magnet in flexible elastic material, it is to be understood that various other adaptations and modifications may be made within the spirit and scope of the embodiments herein. Thus, while the foregoing description has been directed to specific embodiments, it will be apparent that other variations and modifications may be made to the described embodiments, with the attainment of some or all their advantages. Accordingly, this description is to be taken only by way of example and not to otherwise limit the scope of the embodiments herein.

What is claimed is:

1. A substantially rigid cup comprising a base on one end and walls extending to an opening on the other end, forming a rim on the open end,
   a) wherein the exterior edge of said rim is rounded,
   b) wherein a magnet is inserted into the base of the cup,
   c) wherein the interior corners between the base of the cup and the interior walls are chamfered, and the magnet rests on the chamfer,
   d) the walls of the cup are taller than the height of the magnet insdie the said base, e) wherein the walls are comprised of multiple openings, and f) wherein a flexible elastic material is cured around the walls of the cup, inside the cup, around the magnet, and around the rim, but the base of the cup remains exposed, such that the magnet and cup are embedded in the flexible elastic material with the base visible on a surface of the flexible elastic material.

2. The cup of claim 1, wherein the cup is cylindrical.

3. The cup of claim 2, wherein the walls of the cup are a section of a cone, and the base has a smaller diameter than the rim.

4. The cup of claim 1, wherein the rim is curved at a five-tenths millimeter radius.

5. The cup of claim 1, wherein multiple openings are positioned on the walls between the rim and the height of the magnet, such that the proportion of holes in the walls is greater than one-half of the area of the walls.

6. The cup of claim 1, wherein the angle of the chamfer is forty-five degrees.

7. The flexible elastic material of claim 1, wherein the surface of the flexible elastic material is one of the following: flat, convex, and concave.

8. The cup of claim 1, embedded in the end of an extension of flexible elastic material, forming a limb.

9. The cup of claim 1, wherein the cup is comprised of one of the following types of plastic: polypropylene, and acrylonitrile butadiene styrene.

10. The cup of claim 1, wherein the flexible elastic material is made of one of the following materials: silicone, platinum core silicone, thermoplastic polyurethane, polyurethane rubber, and flexible urethane foam.

11. The magnet of claim 1, wherein the pull force is five and five-tenths pounds.

12. The flexible elastic material of claim 1, wherein at least two magnets are embedded.

13. The flexible elastic material of claim 12, wherein at least two magnets emit alternate polarities from the base of their respective cups, such that the flexible elastic material may bend and connect the at least two magnets.

14. A substantially rigid container comprising a base on one end and walls extending to an opening on the other end, forming a rim on the open end,
   a) wherein a magnet is inside the base of the container,
   b) wherein the interior corners between the base of the container and the interior walls are chamfered, and the magnet rest on the chamfer,
   c) the walls of the container are taller than the height of the magnet,
   d) wherein the walls are comprised of multiple openings, and
   e) wherein a flexible elastic material is cured around the walls of the container, inside the container, around the magnet, and around the rim, but the base of the container remains exposed, such that the magnet and container are embedded in the flexible elastic material with the base visible on a surface of the flexible elastic material.

15. A method of making the produce of claim 1, comprising:
   a. placing a magnet in a substantially rigid cup,
      i. wherein the cup is comprised of a base on one end and walls extending to an opening on the other end forming a rim,
      ii. wherein the exterior edge of the rim is rounded, and
      iii. wherein the walls of the cup are comprised of multiple holes,
   b. positioning the cup and magnet in a mold, and
   c. filling the mold with curable flexible elastic material,
      i. such that the curable flexible elastic material surrounds the walls and rim of the cup, enters the multiple holes in the walls of the cup, and fills the interior of the cup around the magnet, and
      ii. the exterior base of the cup is exposed outside the flexible elastic material, and
   d. curing the flexible elastic material to bind with the embedded cup and magnet.

16. The method of claim 15, wherein the proportion of multiple holes in the walls of the cup are greater than one-half the area of the walls.

17. The method of claim 15, wherein the flexible elastic material is cured to form a surface comprising one of the following: a flat surface, a convex surface, a concave surface.

18. The method of claim 15, wherein the flexible elastic material is cured to form a limb, an extension with the magnet embedded in the end.

19. The method of claim 15, wherein the cup is comprised of one of the following types of plastic: polypropylene, and acrylonitrile butadiene styrene.

20. The method of claim 15, wherein the curable flexible elastic material is made of one of the following materials: silicone, platinum core silicone, thermoplastic polyurethane, polyurethane rubber, and flexible urethane foam.

* * * * *